United States Patent
Yasuda

(10) Patent No.: US 11,450,518 B2
(45) Date of Patent: Sep. 20, 2022

(54) MASS SPECTROMETER AND CHROMATOGRAPH MASS SPECTROMETER

(71) Applicant: SHIMADZU CORPORATION, Kyoto (JP)

(72) Inventor: Hiroyuki Yasuda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 562 days.

(21) Appl. No.: 16/484,324

(22) PCT Filed: Mar. 23, 2017

(86) PCT No.: PCT/JP2017/011852
§ 371 (c)(1),
(2) Date: Aug. 7, 2019

(87) PCT Pub. No.: WO2018/173223
PCT Pub. Date: Sep. 27, 2018

(65) Prior Publication Data
US 2020/0035479 A1    Jan. 30, 2020

(51) Int. Cl.
*H01J 49/00* (2006.01)
*G01N 30/02* (2006.01)
(Continued)

(52) U.S. Cl.
CPC .......... *H01J 49/0045* (2013.01); *G01N 30/02* (2013.01); *G01N 30/86* (2013.01);
(Continued)

(58) Field of Classification Search
CPC .... G01N 30/02; G01N 30/86; G01N 30/8651; G01N 30/8675; G01N 30/8679;
(Continued)

(56) References Cited

U.S. PATENT DOCUMENTS

2010/0112706 A1* 5/2010 Liu .............. H01J 49/0031
                                                            436/77
2015/0102219 A1   4/2015 Yamamoto

FOREIGN PATENT DOCUMENTS

| CN | 104569234 A | 4/2015 | |
| JP | 2017-020877 A | 1/2017 | |
| WO | WO-2015118321 A1 * | 8/2015 | .......... H01J 49/0036 |

OTHER PUBLICATIONS

Maralikova et al.—"Confirmatory analysis for drugs of abuse in plasma and urine by high-performance liquid chromatography-tandem mass spectrometry with respect to criteria for compound identification" (Year: 2004).*
Communication dated Aug. 17, 2021 from The State Intellectual Property Office of P.R. of China in Application No. 201780088879.1.
The Extended European Search Report dated Feb. 27, 2020, issued in application No. 17901546.6.
(Continued)

*Primary Examiner* — Benjamin R Schmitt
(74) *Attorney, Agent, or Firm* — Sughrue Mion, PLLC

(57) ABSTRACT

A mass spectrometer includes: a target compound input receiving section for receiving an input of one or more target compounds; a measurement execution section for reading MRM measurement conditions, including a plurality of MRM transitions, respectively corresponding to the one or more target compounds from a storage section, and measuring the sample under the MRM measurement conditions; a measured multi-MRM spectrum creation section for creating a measured multi-MRM spectrum indicating an intensity of product ions as a mass peak on a graph having mass-to-charge ratios of the product ions on one axis, the intensity of the product ions acquired by measuring the sample; and a similarity degree calculation section for obtaining for each of the target compounds, a degree of similarity between standard multi-MRM spectrum stored in the storage section and the measured multi-MRM spectrum.

6 Claims, 6 Drawing Sheets

(51) Int. Cl.
*H01J 49/42* (2006.01)
*G01N 30/86* (2006.01)
*H01J 49/24* (2006.01)

(52) U.S. Cl.
CPC ..... *G01N 30/8651* (2013.01); *G01N 30/8675* (2013.01); *G01N 30/8679* (2013.01); *H01J 49/005* (2013.01); *H01J 49/0031* (2013.01); *H01J 49/4225* (2013.01); *G01N 2030/025* (2013.01); *H01J 49/24* (2013.01)

(58) Field of Classification Search
CPC ............ G01N 2030/025; H01J 49/4225; H01J 49/0031; H01J 49/0045; H01J 49/005; H01J 49/24
See application file for complete search history.

(56) References Cited

OTHER PUBLICATIONS

Shimadzu Corporation: "Application News Analysis of Steroids and NSAIDs Using the Shimadzu LCMS-8050 Triple Quadrupole Mass Spectrometer LAAN-A-LM-E069 n MRM Analysis of Standards and Matrix-Matched Calibration Curves", No. C98, Jan. 2015 (2 pgs. total), Retrieved from the Internet: URL:https://www.shimadzu.de/sites/shimadzu.seg/files/ster06_analysis_of_steroids_and_nsaids_using_the_shimadzu_lcms-8050.pdf [retrieved on Feb. 20, 2020].
International Search Report of PCT/JP2017/011852 dated Jun. 13, 2017 [PCT/ISA/210].
Written Opinion of PCT/JP2017/011852 dated Jun. 13, 2017 [PCT/ISA/237].

* cited by examiner

Fig. 3

| COMPOUND | RETENTION TIME | MEASUREMENT TIME | MRM1 | MRM2 | MRM3 | ... |
|---|---|---|---|---|---|---|
| COMPOUND A | 1.794 | 0.00-5.00 | 163.10>130.00 | 163.10>117.00 | 163.10>132.10 | ... |
| COMPOUND B | 2.005 | 0.00-5.00 | 167.20>68.00 | 167.20>110.00 | 195.00>68.00 | ... |
| ... | ... | ... | ... | ... | ... | ... |

Fig. 4

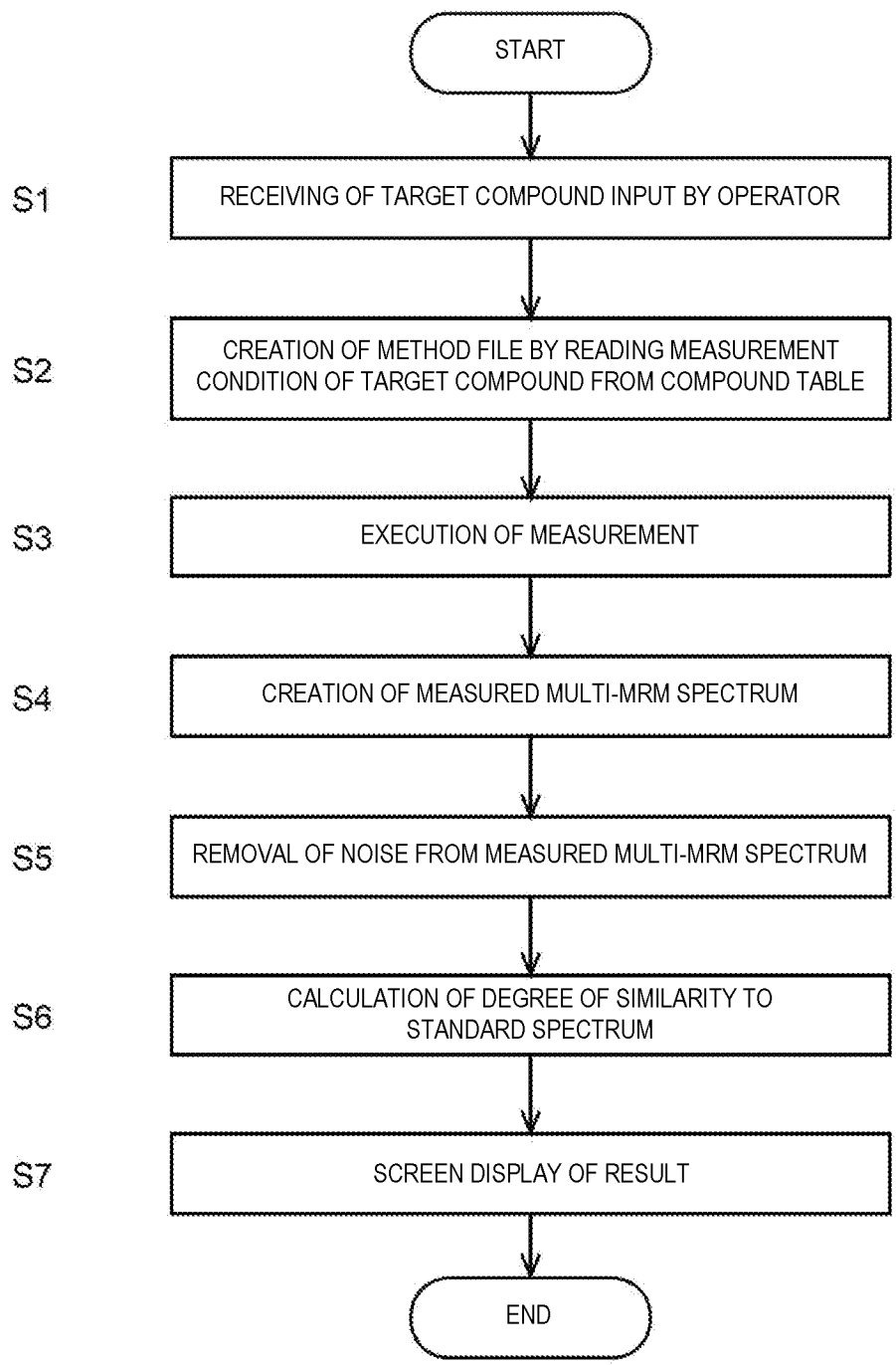

S1 — RECEIVING OF TARGET COMPOUND INPUT BY OPERATOR

S2 — CREATION OF METHOD FILE BY READING MEASUREMENT CONDITION OF TARGET COMPOUND FROM COMPOUND TABLE

S3 — EXECUTION OF MEASUREMENT

S4 — CREATION OF MEASURED MULTI-MRM SPECTRUM

S5 — REMOVAL OF NOISE FROM MEASURED MULTI-MRM SPECTRUM

S6 — CALCULATION OF DEGREE OF SIMILARITY TO STANDARD SPECTRUM

S7 — SCREEN DISPLAY OF RESULT

| EVENT | COMPOUND | EXECUTION PERIOD | NUMBER OF CHANNELS |
|---|---|---|---|
| 1 | COMPOUND A | 0.00-5.00 | 11 |
| 2 | COMPOUND B | 0.00-5.00 | 15 |
| 3 | COMPOUND C | 3.00-7.00 | 15 |
| 4 | COMPOUND E | 4.00-7.00 | 18 |
| ... | ... | ... | ... |
| 100 | COMPOUND X | 25.00-30.00 | 15 |

| CHANNEL | PRECURSOR ION | PRODUCT ION | CE(V) |
|---|---|---|---|
| 1 | 163.10 | 130.00 | -22.0 |
| 2 | 163.10 | 117.00 | -26.0 |
| 3 | 163.10 | 132.10 | -16.0 |
| 4 | 163.10 | 106.10 | -17.0 |
| 5 | 163.10 | 83.00 | -16.0 |
| ... | ... | ... | ... |
| 11 | 182.40 | 52.00 | -15.0 |

REPEATED EXECUTION OF EVENT 1 (CHANNEL 1 TO 10) AND EVENT 2 (CHANNEL 1 TO 15) ONE TIME EACH

MASS SPECTROMETER AND CHROMATOGRAPH MASS SPECTROMETER

CROSS REFERENCE TO RELATED APPLICATIONS

This application is a National Stage of International Application No. PCT/JP2017/011852, filed Mar. 23, 2017.

TECHNICAL FIELD

The present invention relates to a mass spectrometer capable of performing an $MS^n$ analysis (where n is an integer equal to or greater than two), and more specifically, to a mass spectrometer for performing the $MS^n$ analysis on purpose of screening for a target compound. Additionally, the present invention relates to a chromatograph mass spectrometer in which the mass spectrometer is combined with a chromatograph device such as a gas chromatograph or a liquid chromatograph.

BACKGROUND ART

A chromatograph mass spectrometer is widely used for an identification or a quantitative determination of a target compound, e.g., agricultural pesticide, contained in a sample such as food or others. As a method for each of the identification and the quantitative determination of a target compound contained in a sample by use of a chromatograph mass spectrometer, there is known a multiple reaction monitoring (MRM) measurement. The MRM measurement employs a mass spectrometer including: a front mass separation section in which a precursor ion is selected; a fragmentation section in which the precursor ion selected in the front mass separation section is fragmented into product ions; and a rear mass separation section in which the product ions generated in the fragmentation section are subjected to mass separation. The mass spectrometer is, for example, a triple quadrupole mass spectrometer including two quadrupole mass filters, and a collision cell placed between the two quadrupole mass filters.

In the MRM measurement, each of target compounds has MRM measurement conditions previously set. The MRM measurement conditions include an MRM transition which is a combination of the precursor ion generated from each of the target compounds and the product ions generated by fragmentation of the precursor ion. In an MRM measurement, the intensity of the product ions is measured under the MRM measurement conditions. In many cases, an MRM transition having the highest measurement sensitivity of the product ions is used as an MRM transition for quantitation (hereinafter, referred to as a "Quantitation MRM transition"), and an MRM transition having the second highest measurement sensitivity of the product ions is used as an MRM transition for determination of the quantitation (hereinafter, referred to as "Determination MRM transition"). For each of the compounds temporally separated in a column of a chromatograph, the intensity of product ions is measured in accordance with each of the Quantitation MRM transition and the Determination MRM transition. Then, a mass chromatogram for each of the MRM transitions is acquired. Each of the mass chromatograms has a peak area (or peak height), and a quantity of each of the target compounds is determined from the mass chromatogram peak area (or peak height) of the Quantitation MRM transition. Additionally, the determination (identification) is made whether or not the mass chromatogram peak matches that of the corresponding target compound, based on a comparison between a ratio of the mass chromatogram peak area (or peak height) of Quantitation MRM transition to the mass chromatogram peak area (or peak height) of the Determination MRM transition and a ratio previously acquired by MRM measurements of a reference standard or the like (for example, see Patent Literature 1).

The sample such as food or others includes various compounds (foreign compounds) in addition to the target compounds, and in some cases, each of the target compounds is not fully separated from the foreign compounds in the column of the chromatograph. Such foreign compounds include a compound which was not presumed to exist in the sample. During the time (retention time) in which each of the target compounds is eluted from the column, the foreign compounds may also be eluted. The foreign compounds may generate product ions to be measured in accordance with the Quantitation MRM transition and the Determination MRM transition. Then, the product ions generated from the foreign compounds may be concurrently measured with the product ions from the corresponding target compound. As a result, even when the corresponding target compound, e.g., agricultural pesticide, is not included, the sample may be wrongly determined to include the target compound, (which is referred to as a false-positive), or the quantity of the target compound may be determined to be greater than the actual quantity.

In order to prevent the false-positive to improve a reliability for the identification and the quantitative determination of the target compounds, in the conventional configuration, an additional measurement plus the MRM measurement is performed as follows. In the additional measurement, during the period (retention time) in which each of the target compounds separated in the column of the chromatograph is eluted from the column, the MRM measurement in accordance with one MRM transition is repeated as a survey event (see FIG. 1A). When a measured intensity of product ions in the MRM measurement exceeds a previously specified threshold value, the state is determined as a trigger for a dependent event in which a product ion scan measurement is executed in accordance with each of a plurality of different collision energies (for example, three different collision energies of −10.0 V, −35.0 V. and −50.0 V). The product ion scan measurement is performed in accordance with the plurality of different collision energies, because each product ion requires a different optimal collision energy (collision energy having a highest sensitivity). This configuration prevents a failure in detecting the characteristic product ions generated from the target compounds. During the period of retention time for each of the target compounds, a cycle of measurements, which is composed of the MRM measurement as the survey event and the plurality of product ion scan measurements as the dependent event, is repeatedly performed. At completion of the measurements, a product ion spectrum (see FIG. 1B) is acquired from each of the plurality of product ion scan measurements. Then, these product ion spectra (FIG. 1B) are combined into one as a composite product ion spectrum (see FIG. 1C). The composite product ion spectrum indicates a plurality of product ion mass peak positions (mass-to-charge ratios) and intensities of product ions, both characteristic of the corresponding target compound. The composite product ion spectrum is cross-checked with another composite product ion spectrum previously created by measuring a reference standard of the corresponding target compound under the same conditions. These spectra are cross-checked with respect to the product ion mass peak positions and the intensities of product ions. Normally, a product ion spectrum indicates many mass peaks respectively corresponding to product ions characteristic of the target compounds. Accordingly, by cross-checking these mass peaks, it is possible to select each of the target compounds (screening for the target compound) and prevent the false-positive.

CITATION LIST

Patent Literature

Patent Literature 1: JP 2017-020877 A

SUMMARY OF INVENTION

Technical Problem

In the product ion scan measurement, voltage applied to the rear mass separation section is changed so that the mass-to-charge ratio of product ions to be allowed to pass through the rear mass separation section is changed on a bit-by-bit basis. For example, in the product ion scan measurement of measuring a mass-to-charge ratio range from 100 to 1000 and changing the mass-to-charge ratio by 0.1 at a time, which exemplifies a normal measurement condition, the voltage applied to the rear mass separation section is changed at 9,000 steps and the intensity of product ions is measured at each of the steps. In the product ion scan measurement, therefore, the intensity of product ions is measured at each of the many steps, requiring a length of time for each measurement. Additionally, in the conventional mass spectrometer, as previously described, the product ion scan measurement is executed under the plurality of conditions in which the collision energy varies. The cycle of measurements previously described is executed by performing each of the plurality of product ion scan measurements, thus requiring further time. The length of time (loop time) required for the cycle of measurements corresponds to an interval of time at which the measurement data is acquired. This causes concerns, for example, when creating the mass chromatogram of mass-to-charge ratio on the composite product ion mass spectrum or a total ion chromatogram, the peak data points are not sufficient, hindering acquisition of correctly shaped peaks and thus resulting in poor reproducibility.

The present invention has been developed to solve the above problems. An object of the present invention is to provide a mass spectrometer provided with a front mass separation section in which a precursor ion is selected, a fragmentation section in which the precursor ion is fragmented into product ions, and a rear mass separation section in which the product ions are subjected to mass separation, and thus capable of performing an $MS^n$ analysis, that is possible to acquire a spectrum including a plurality of product ion peaks characteristic of a target compound, at shorter interval of time than in the conventional configuration.

Solution to Problem

The present invention developed for solving the above problems is a mass spectrometer provided with: a front mass separation section in which an ion having a predetermined mass-to-charge ratio is selected as a precursor ion among ions originating from a compound contained in a sample; a fragmentation section in which the precursor ion selected in the front mass separation section is fragmented into product ions; and a rear mass separation section in which the product ions generated in the fragmentation section are subjected to mass separation, and capable of performing an $MS^n$ analysis (where n is an integer equal to or greater than two), the mass spectrometer including:

a) a storage section for storing a plurality of MRM measurement conditions and a plurality of data sets of standard multi-MRM spectrums respectively corresponding to a plurality of compounds, wherein each of the plurality of a MRM measurement conditions include a plurality of MRM transitions, each of the plurality of MRM transitions being a combination of the precursor ion and the product ions, and each of the plurality of data sets of standard multi-MRM spectrums represents a mass spectrum indicating an intensity of product ions as a mass peak on a graph having mass-to-charge ratios of the product ions on one axis, the intensity of the product ions being measured by executing the MRM measurement condition;

b) a target compound input receiving section for receiving an input indicating one or more target compounds by an operator;

c) a measurement execution section for reading, from the storage section, the MRM measurement conditions respectively corresponding to the one or more target compounds, and measuring the sample under the MRM measurement conditions;

d) a measured multi-MRM spectrum creation section for creating a measured multi-MRM spectrum indicating an intensity of product ions as a mass peak on a graph having mass-to-charge ratios of the product ions on one axis, the intensity of the product ions being acquired by measuring the sample; and e) a similarity degree calculation section for obtaining for each of the one or more target compounds, a degree of similarity between the standard multi-MRM spectrum stored in the storage section and the measured multi-MRM spectrum.

The mass spectrometer according to the present invention may be a triple quadrupole mass spectrometer in which the front mass separation section, the fragmentation section, and the rear mass separation section are configured as separate bodies, or the like. Alternatively, the mass spectrometer may include an ion trap in which the front mass separation section is integrally formed with the fragmentation section, or the like. In other words, the mass spectrometer may have various configurations capable of performing an $MS^2$ or $MS^n$ (where n is greater than 2) analysis. In a case of the former type, the mass spectrometer is capable of performing the $MS^2$ analysis. In a case of the latter type, the mass spectrometer is capable of performing, in addition to the $MS^2$ analysis, an $MS^3$ or higher order $MS^n$ analysis. In the case of $MS^2$ analysis, the precursor ion of the MRM transitions is directly generated from each of the compounds contained in the sample. In the case of $MS^3$ or higher order analysis, the precursor ion of the MRM transitions is generated by fragmenting each of the compounds contained in the sample once or more than once (n–2 times).

With the mass spectrometer according to the present invention, each of the compounds contained in the sample is measured under the MRM measurement condition including a plurality of MRM transitions (i.e., multi-MRM measurement), where the intensity of product ions is measured at each of the MRM transitions. Based on the intensity of product ions measured under each of the plurality of MRM transitions, the measured multi-MRM spectrum is created as the compilation of the intensity of product ions. As a result, a product ion spectrum is acquired in simulated form. Then, the degree of similarity between the standard multi-MRM spectrum previously created from measurement results of a reference standard or the like under the same MRM measurement conditions and the measured multi-MRM spectrum is obtained. The degree of similarity allows the operator to determine whether or not each of the measured compounds in the sample matches the target compound. The number of the plurality of MRM transitions determines that the corresponding target compound is reliably subjected to screening. The number of MRM transitions varies according to molecular weight, molecular structure, or like of the target compounds, but three or more MRM transitions, each having a different mass-to-charge ratio of at least one of the precursor ion or the product ions, are preferably used. In some cases, the screening may be performed at higher accuracy by using a greater number of MRM transitions, but these cases increase length of time required for the measurement. Thus, for example, when a mobile phase is at a high flow rate in a liquid chromatograph unit provided as a front stage of the mass spectrometer, the number of data points may not be sufficient in some measurement conditions. Typically, the number of data points required for sufficient reproducibility is at least five or more in chromatogram peak of each target compound, or possibly preferably, 10 or more in the chromatogram peak. Accordingly, for the number of the plurality of MRM transitions, an optimal number of MRM transitions may be selected in accordance with nature of the target compound subjected to the screening, e.g. the molecular weight or the molecular structure, and chromatograph measurement conditions for analysis of the target compound. In many cases, with 6 to 16 MRM transitions characteristic of the target compound used, the target compound is reliably subjected to the screening and concurrently, the sufficient data points are acquired.

In a conventional product ion scan measurement, the mass-to-charge ratio of product ions to be allowed to pass through the rear mass separation section was scanned by changing voltage applied to the rear mass separation section on a bit-by-bit basis. For example, in a case of scanning a mass-to-charge ratio range from 100 to 1000 and changing the mass-to-charge ratio of the ions to be allowed to pass through the rear mass separation section by 0.1 at a time, 9,000 steps were required to change the voltage to perform the product ion scan measurement one time, and the intensity of product ions was measured at each of the steps. On the other hand, with the mass spectrometer according to the present invention, the MRM measurement is performed using the plurality of MRM transitions. Thus, the number of steps to change the mass-to-charge ratio may be equivalent to that of the MRM transitions used, thereby resulting in a reduction in length of time (loop time) required for executing a series of measurements. Additionally, the conventional product ion scan measurement was required to be performed under the plurality of conditions in which the collision energy varies. In a contrast, in the multi-MRM measurement executed according to the present invention, the MRM measurement is performed in accordance with the optimal collision energy (i.e., collision energy having highest detection sensitivity of product ions) for each of the MRM transitions. The multi-MRM measurement is thus not required to be performed in accordance with various collision energies, thereby resulting in further reduction in the loop time. For example, in a comparison between the product ion scan measurement (conventional) performed in accordance with each of three different collision energies and the multi-MRM measurement (the prevent invention) performed in accordance with 10 MRM transitions, the former (conventional) requires 27,000 steps per cycle of measurements to change the applied voltage, while the latter (the prevent invention) requires 10 steps. This configuration causes a significant reduction in length of time required for a cycle of measurements. Furthermore, this increases a length of time for measuring each of the mass-to-charge ratios, and thus improves the measurement accuracy.

The mass spectrometer according to the present invention may preferably further include:

f) a spectrum display section for displaying, for each of the one or more target compounds, the standard multi-MRM spectrum and the measured multi-MRM spectrum. With the mass spectrometer of an aspect including the spectrum display section, the operator visually confirms the standard multi-MRM spectrum and the measured multi-MRM spectrum so as to visually grasp the similarity between these spectra.

Furthermore, in the conventional product ion scan measurement, the mass-to-charge ratio of precursor ion was fixed, whereas with the mass spectrometer according to the present invention, the mass-to-charge ratio of precursor ion varies in accordance with the plurality of MRM transitions. When the target compounds are ionized, a substance to which each of the target compounds is likely to be attached or detached varies according to a characteristic of the corresponding target compound, e.g., molecular structure. The mass spectrometer according to the present invention can measure the product ions by using an MRM transition which includes, as the precursor ion, an adduct ion varying corresponding to the characteristic of each of the target compounds, or the like. This configuration provides a high degree of freedom in selection of MRM transitions so that each of the target compounds is more reliably subjected to the screening than in the conventional configuration.

The present invention further provides a chromatograph mass spectrometer preferably including:

g) a chromatograph for temporally separating each of the compounds contained in the sample, wherein the MRM measurement conditions further include information for a period of measurement time during which the sample is measured based on the MRM measurement conditions, and the measurement execution section repeatedly performs an execution in which the sample is measured based on the MRM measurement conditions during the period of measurement time.

With the mass spectrometer according to the present invention, the product ion spectrum is acquired in simulated form by using the plurality of MRM transitions. Thus, even when a plurality of foreign compounds are concurrently introduced with the target compound into the mass spectrometer, the target compound is still subjected to the screening based on the plurality of the product ion mass-to-charge ratios and intensities indicated on the spectrum. Furthermore, with the chromatograph mass spectrometer of an above aspect, the number of foreign compounds introduced into the mass spectrometer concurrently with the target compound is reduced, thereby resulting in more reliable screening of the target compound.

With the chromatograph mass spectrometer, the period of measurement time preferably includes a period before a time at which an elution of the target compound from the chromatograph begins and/or a period after a time at which the elution of the target compound from the chromatograph completes.

With the chromatograph mass spectrometer of the aspect, a noise multi-MRM spectrum, which is composed of a noise peak and excludes the mass peaks originating from the target compound, is acquired. The measured multi-MRM spectrum may be acquired at higher accuracy by performing a process of subtracting the noise multi-MRM spectrum from the measured multi-MRM spectrum.

More specifically, the chromatograph mass spectrometer of the above aspect preferably has an aspect of further including:

h) a noise removal spectrum creation section for performing for each of the one or more target compounds, a process of subtracting data for the measured multi-MRM spectrum acquired outside a period of retention time of the corresponding target compound from the measured multi-MRM spectrum acquired within the period of retention time of the corresponding target compound. This configuration results in the measured multi-MRM spectrum at higher accuracy without any requirement of the operator.

Advantageous Effects of Invention

With a mass spectrometer according to the present invention, it is possible to acquire a spectrum including a plurality of product ions peaks characteristic of each of target compounds, at shorter interval of time than with a conventional mass spectrometer.

BRIEF DESCRIPTION OF DRAWINGS

FIG. 3 is a compound table used in the chromatograph mass spectrometer of the present embodiment.

FIG. 4 is a flow chart of an analysis using the chromatograph mass spectrometer of the present embodiment.

DESCRIPTION OF EMBODIMENTS

Figure 2:
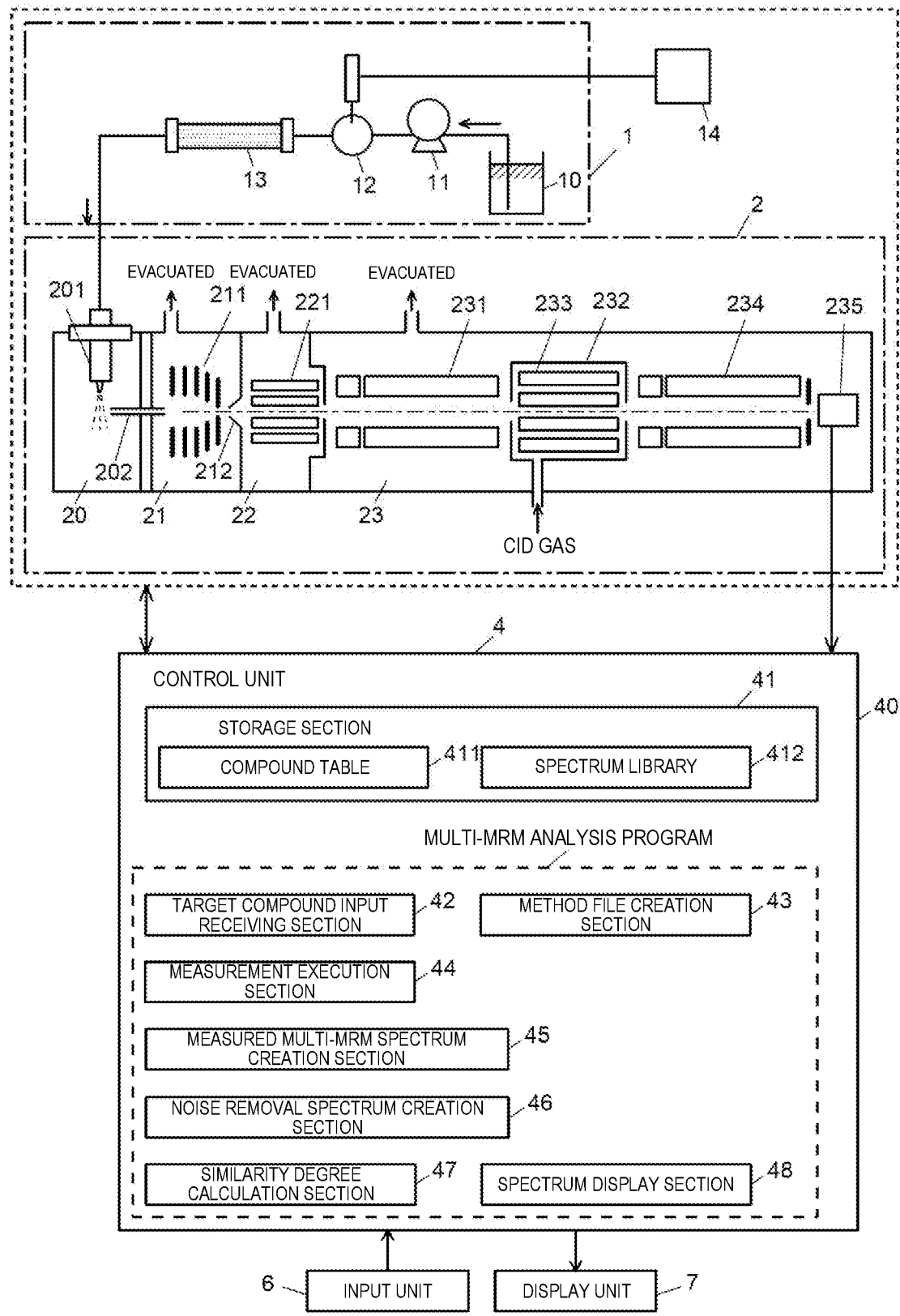
FIG. 2 is a configuration diagram of main components as one embodiment of each of a mass spectrometer according to the present invention and a chromatograph mass spectrometer according to the present invention.

Embodiments of a mass spectrometer according to the present invention and a chromatograph mass spectrometer according to the present invention are hereinafter described with reference to the attached drawings. FIG. 2 is a configuration diagram of main components as the present embodiment of a liquid chromatograph mass spectrometer in which a liquid chromatograph is combined with the mass spectrometer.

The liquid chromatograph mass spectrometer of the present embodiment mainly includes a liquid chromatograph unit 1, a mass spectrometer unit 2, and a control unit 4 for controlling operations of these units. The liquid chromatograph unit 1 includes a mobile phase container 10 in which a mobile phase is stored, a pump 11 for drawing the mobile phase and supplying the mobile phase at a fixed flow rate, an injector 12 for injecting a predetermined amount of sample liquid into the mobile phase, and a column 13 for temporally separating various compounds contained in the sample liquid. The liquid chromatograph unit 1 is connected to an auto-sampler 14 for introducing a plurality of liquid samples one by one into the injector 12.

The mass spectrometer unit 2 has a configuration of a multi-stage differential pumping system provided between an ionization chamber 20 maintained at approximately atmospheric pressure, and an analysis chamber 23 evacuated to a high degree of vacuum by a vacuum pump (not shown). The multi-stage differential pumping system includes a first intermediate vacuum chamber 21 and a second intermediate vacuum chamber 22, each having a degree of vacuum increased in a stepwise manner, between the ionization chamber and the analysis chamber 23. The ionization chamber 20 is provided with an electrospray ionization probe (ESI probe) 201 for nebulizing sample solution while imparting electric charges to the sample solution. The ionization chamber 20 communicates with the first intermediate vacuum chamber 21 as the next stage via a heated capillary 202 of a thin diameter. The first intermediate vacuum chamber 21 is separated from the second intermediate vacuum chamber 22 by a skimmer 212 having a small hole at its apex. The first intermediate vacuum chamber 21 and the second intermediate vacuum chamber 22 respectively include an ion guide 211 and an ion guide 221, each for transporting ions to the next stage while converging the ions. The analysis chamber 23 includes a front quadrupole mass filter (Q1) 231 which separates ions according to mass-to-charge ratios of the ions, a rear quadrupole mass filter (Q3) 234 which also separates ions according to mass-to-charge ratios of the ions, and a collision cell 232 which internally includes a multipole ion guide (q2) 233 and is placed between the front quadrupole mass filter (Q1) 231 as its previous stage and the rear quadrupole mass filter (Q3) 234 as its next stage. The analysis chamber 23 also includes an ion detector 235 placed as the next stage of the rear quadrupole mass filter (Q3) 234. CID gas, such as argon or nitrogen, is appropriately supplied into the collision cell 232 in accordance with the measurement conditions.

The mass spectrometer unit 2 performs various measurements, such as a SIM (selected ion monitoring) measurement, an MS/MS scan measurement (product ion scan measurement), and an MRM (multiple reaction monitoring) measurement. In the SIM measurement, the front quadrupole mass filter (Q1) 231 is not used for selecting ions (i.e., not functioning as a mass filter), and the mass-to-charge ratio of ions to be allowed to pass through the rear quadrupole mass filter (Q3) 234 is fixed for ion detection.

On the other hand, in the MS/MS scan measurement and the MRM measurement, the front quadrupole mass filter (Q1) 231 and the rear quadrupole mass filter (Q3) 234 both function as the mass filters. The front quadrupole mass filter (Q1) 231 allows only ions having a mass-to-charge ratio designated as a precursor ion to pass through. Additionally, the CID gas is supplied into the collision cell 232 so as to fragment the precursor ion into product ions. In the MS/MS scan measurement, the mass-to-charge ratio of the ions to be allowed to pass through the rear quadrupole mass filter (Q3) 234 is continuously changed so as to detect the product ions. In the MRM measurement, the mass-to-charge ratio of the ions to be allowed to pass through the rear quadrupole mass filter (Q3) 234 is fixed so as to detect the product ions.

The control unit 4 includes a storage section 41 and the following functional blocks: a target compound input receiving section 42, a method file creation section 43, a measurement execution section 44, a measured multi-MRM spectrum creation section 45, a noise removal spectrum creation section 46, a similarity degree calculation section 47, and a spectrum display section 48. The control unit 4 is actually a personal computer including a CPU which fulfills functions as the sections of the control unit 4 by executing a multi-MRM analysis program previously installed on the computer. The control unit 4 also has an input unit 6 and display unit 7 connected to the control unit 4.

The storage section 41 includes a compound table 411 storing previously specified analysis conditions for a plurality of known compounds, and a spectrum library 412 storing spectrum data (multi-MRM spectrum data as will be described later) for the plurality of known compounds.

FIG. 3 is an example of the compound table 411. The compound table 411 stores, for each of the compounds, a retention time and information such as a plurality of MRM transitions characteristic of the corresponding compound. In the compound table 411 in FIG. 3, each of the compounds has a single retention time specified. When a plurality of columns may be used, each of the compounds has a retention time stored for each of the columns. While not shown in FIG. 3, the compound table 411 also stores an optimal collision energy (CE: collision energy) which is obtained by preliminary measurements and specified in correspondence to each of the MRM transitions.

The spectrum library 412 stores spectrum data previously acquired by measuring a reference standard using the plurality of MRM transitions stored in the compound table 411. The spectrum data indicates an intensity of product ions in accordance with each of the MRM transitions. The intensity is illustrated as a pseudo-product ion spectrum, the spectrum having mass-to-charge ratios of product ions on one axis. In the present description, this mass spectrum is called the multi-MRM spectrum. Additionally, the multi-MRM spectrum stored in the spectrum library 412 is called a standard multi-MRM spectrum so as to be distinguished from a measured spectrum as will be described later. The plurality of MRM transitions stored for the compounds are each a combination of the precursor ion and the product ions, both characteristic of each of the compounds. In the MRM measurement using the MRM transitions, the intensity of product ions for each of the compounds is measured. Accordingly, the standard multi-MRM spectrum stored in the spectrum library 412 includes an equivalent number of mass peaks to that of the MRM transitions stored in the compound table 411. The number of MRM transitions respectively corresponding to the compounds determines that the component contained in the sample reliably matches the target compound (is reliably subjected to screening). The number of MRM transitions varies in accordance with molecular weight, molecular structure, or like of the target compound, but 10 or more of the MRM transitions are preferably used. In many cases, 10 to 15 of the MRM transitions characteristic of each of the target compounds may be used.

Next, a procedure for an analysis using the chromatograph mass spectrometer of the present embodiment is hereinafter described with reference to the flowchart of FIG. 4. An example of the MRM measurement (i.e., multi-MRM measurement), which uses the plurality of MRM transitions for each of the 100 target compounds contained (likely to be contained) in the sample, is hereinafter described.

When an operator commands an initiation of the analysis by executing the multi-MRM analysis program or the like, the target compound input receiving section 42 displays, on a display window of the display unit 7, a screen allowing the operator to input the target compound. In addition to the screen allowing the operator to input a name of the target compound, the target compound input receiving section 42 may display, for example, a screen including a pull-down list of the compounds stored in the compound table 411 and the spectrum library 412, which thereby allows the operator to select the target compound out of the pull-down list. Alternatively, the target compound input receiving section 42 may display a screen including a prepared group of plurality of compounds (for example, a group of agricultural pesticide compounds contained in food), which thereby allows the operator to collectively select more than one target compounds.

Figures 5A, 5B, 5C:
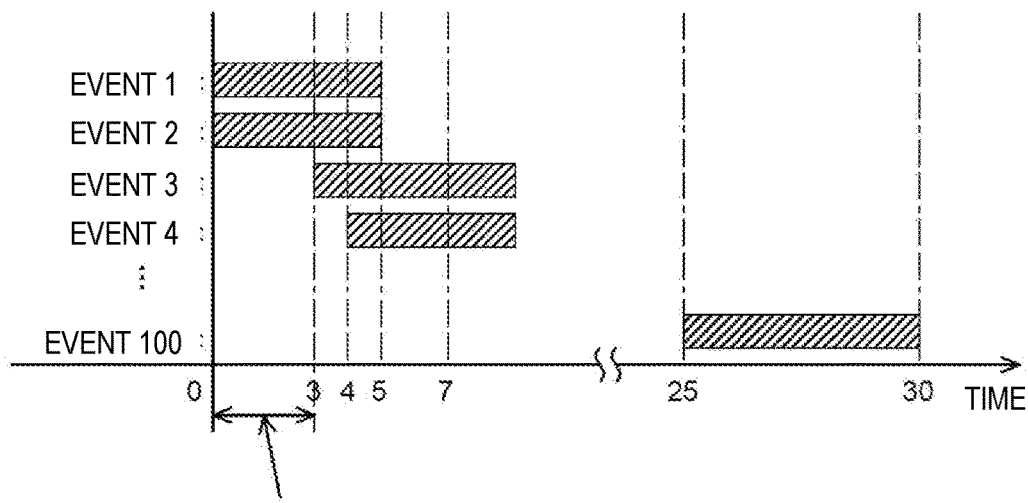
FIGS. 5A to 5C each illustrate or show an example of a method file used in the chromatograph mass spectrometer of the present embodiment.

When the operator inputs each of the target compounds (e.g., Compound A, Compound B, Compound C, Compound E, . . . , and Compound X) (Step S1), the method file creation section 43 reads from the compound table 411 measurement conditions (measurement time and the plurality of MRM transitions) for each of the target compounds input by the operator to create a method file specifying the measurement conditions (Step S2), and displays the method file on the display unit 7. This configuration allows the operator to confirm contents of the method file on the display window. FIGS. 5A to 5C each illustrate or show an example of the method file created by the method file creation section 43. In the method file, an event for each of the compounds is specified along with an execution period of the event. When an event (compound) is selected on a screen of FIG. 5A, a list of channels set for the event is displayed as shown in FIG. 5B. Each of the channels is provided for the corresponding MRM transition, and has a value of the corresponding collision energy (CE) previously stored in the compound table 411. The method file has a number of events set, the number (100) equivalent to that of the target compounds input by the operator. Each of the events has the corresponding compound, for which a number of channels are set, the number equivalent to that of the MRM transitions stored in the compound table 411.

When the operator commands an initiation of the measurement by pressing a predetermined button on the display window of the display unit 7 or other operations, the measurement execution section 44 introduces the liquid sample previously set in the auto-sampler 14 into the injector 12. Various components contained in the liquid sample and introduced into the injector 12 are temporally separated in the column 13 to be sequentially introduced into the ESI probe 201. Each of the components introduced into the ESI probe 201 is nebulized to be ionized in the ionization chamber 20, and is subjected to mass separation in a mass separation section as the next stage so as to be measured.

The measurement is performed based on the measurement conditions specified in the method file. Each of the compounds is sequentially measured according to the plurality of channels (MRM transitions) set in the corresponding event (Step S3). When two or more of the events respectively have the execution period overlapping each other, the plurality of channels set in these events are sequentially and repeatedly performed. For example, in a case of the method file shown in FIG. 5A, during a period of three minutes from the initiation of the measurement, each of the product ion intensity measurement for Compound A (Event 1) in accordance with the plurality of corresponding MRM transitions (channels 1 to 11) and the product ion intensity measurement for Compound B (Event 2) in accordance with the plurality of corresponding MRM transitions (channels 1 to 15) is repeatedly performed. Then, during a period of three to four minutes from the initiation of the measurement, in addition to Compound A and Compound B, the product ion intensity measurement for Compound C in accordance with the plurality of corresponding MRM transitions is repeatedly performed (see FIG. 5C). The same applies in the subsequent periods.

The measurement data acquired in such a configuration is sequentially stored in the storage section 41. In this state, even before and/or after the period specified as the measurement time for each of the events, the measurement execution section 44 measures the intensity of product ions according to each of the MRM transitions (channels) a plurality of times. The storage section 41 stores the data acquired outside the measurement time for each of the events separately from the data acquired within the measurement time for the corresponding event.

Figure 6:
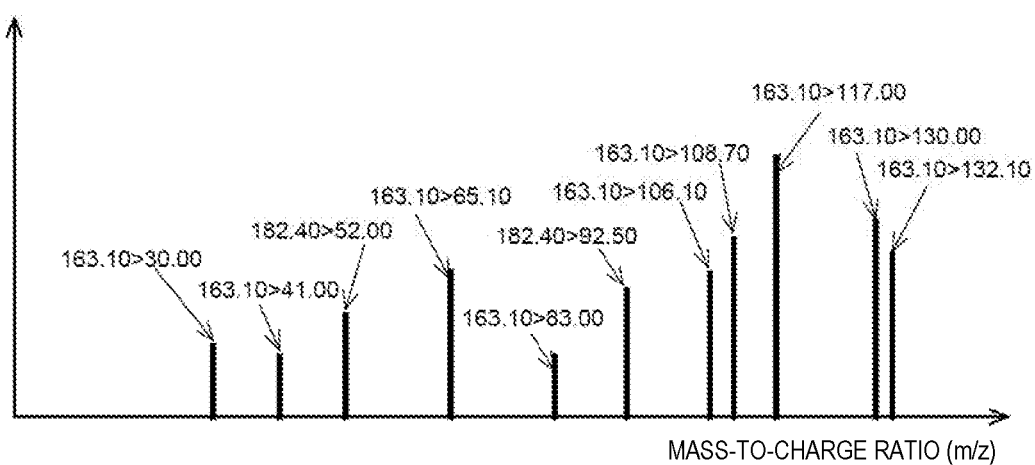
FIG. 6 illustrates an example of a measured multi-MRM spectrum acquired by the chromatograph mass spectrometer of the present embodiment.

At completion of the measurement, the measured multi-MRM spectrum creation section 45 indicates, as a mass peak, the intensity of product ions measured within the measurement time on each of the channels for each of the events, and creates a mass spectrum (measured multi-MRM spectrum) having mass-to-charge ratios of product ions on one axis (Step S4). Furthermore, the noise removal spectrum creation section 46 performs an operation, in which the intensity of product ions measured outside the execution time on the same channel for the same event as above is subtracted from the intensity of product ions indicated in the measured multi-MRM spectrum. Then, the noise removal spectrum creation section 46 creates a measured multi-MRM spectrum after removal of measurement noise (Step S5). FIG. 6 illustrates an example screen display for the measured multi-MRM spectrum (after the removal of noise) of Compound A as created in such a configuration. Each of the 11 MRM transitions (channels) set for Compound A is displayed along with the corresponding mass peak. With the chromatograph mass spectrometer of the present embodiment, the product ion spectrum is acquired in simulated form by the measurements using the plurality of MRM transitions. In the measured multi-MRM spectrum of the present embodiment, mass peaks in accordance with the different precursor ions may be displayed on a single, simulated product ion spectrum.

When the measured multi-MRM spectrum after the removal of noise for each of the target compounds is acquired, the similarity degree calculation section 47 reads the standard multi-MRM spectrum for the corresponding target compound from the spectrum library 412 so as to obtain a degree of similarity between these two spectra. In calculating the degree of similarity for each of the target compounds, the similarity calculation section 47 initially standardizes the measured multi-MRM spectrum. With regards to the standardization, the similarity calculation section 47 has various methods, such as increasing or decreasing sizes of all the mass peaks in the measured multi-MRM spectrum so as to align an intensity of the highest-intensity mass peak in the measured multi-MRM spectrum with an intensity of the highest-intensity mass peak in the standard multi-MRM spectrum, or aligning total intensities of all the mass peaks in the measured multi-MRM spectrum with total intensities of all the mass peaks in the standard multi-MRM spectrum. At completion of the standardization of the measured multi-MRM spectrum, the similarity calculation section 47 compares the intensity of each of the mass peaks with the intensity of corresponding mass peak in the standard multi-MRM spectrum, and obtains the degree of similarity based on the difference between these two spectra (Step S6).

Figure 7:
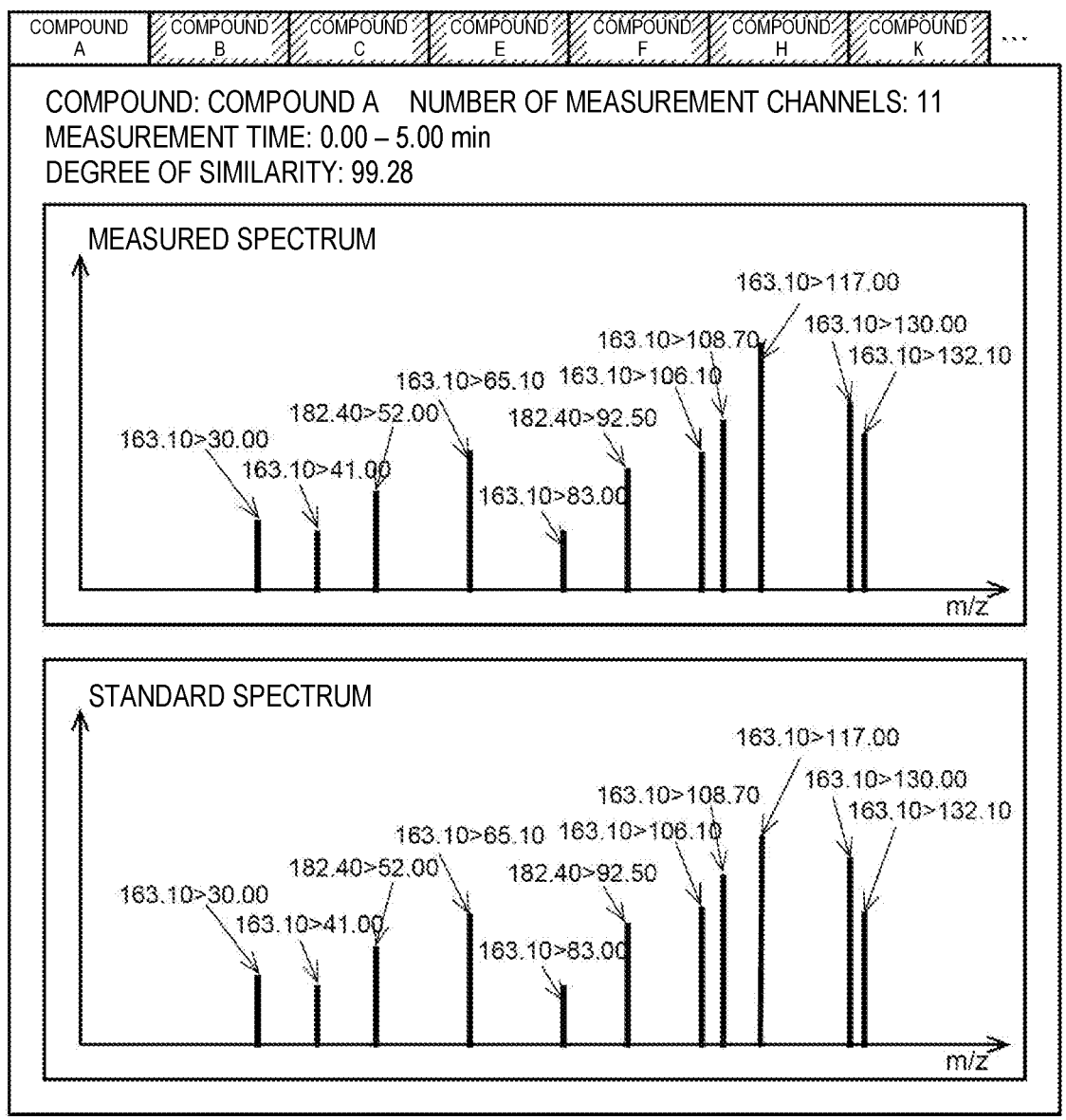
FIG. 7 illustrates an example screen display for a result acquired by the chromatograph mass spectrometer of the present embodiment.

When the similarity degree calculation section 47 completes calculating the degree of similarity for all the target compounds, the spectrum display section 48 shows, on the display window of the display unit 7, the degree of similarity obtained for each of the target compounds, along with the measured multi-MRM spectrum and the standard multi-MRM spectrum (Step S7). FIG. 7 is an example screen display. With the degree of similarity indicated along with the measured spectrum and the standard spectrum on the screen, the operator visually confirms not only a value of the degree of similarity but also a shape of each of these spectra, and thus intuitively grasps whether or not the component contained in the sample matches the target compound. FIG. 7 is a screen showing the result for Compound A, and by switching a tab at top of the screen, the results of the other compounds may also be displayed.

After an identification or a quantitative determination of each of the target compounds is performed, the liquid chromatograph mass spectrometer of the present embodiment may preferably be used to eliminate a false-positive for each of the identification and the quantitative determination. With the chromatograph mass spectrometer of the present embodiment, each of the compounds contained in the sample is measured under the MRM measurement conditions including the plurality of MRM transitions (i.e., multi-MRM measurement) so that the intensity of product ions is measured in accordance with each of the MRM transitions. Based on the intensity of product ions measured in accordance with each of the MRM transitions, the measured multi-MRM spectrum is created as the pseudo-product ion spectrum. Then, the degree of similarity between the standard multi-MRM spectrum previously created from measurement results of a reference standard or the like under the same MRM measurement conditions and the measured multi-MRM spectrum is obtained. The degree of similarity allows the operator to determine whether or not each of the measured compounds in the sample matches the target compound.

Conventionally, in order to eliminate the false-positive, during a period (retention time) in which a target compound separated in the column 13 of the liquid chromatograph unit 1 was eluted from the column 13, an MRM measurement in accordance with one MRM transition was repeated as a survey event. When an intensity of product ions in the MRM measurement exceeded a previously specified threshold value, the state was determined as a trigger for a dependent event in which a product ion scan measurement was performed in accordance with a plurality of different collision energies.

In the conventional product ion scan measurement, a mass-to-charge ratio of product ions to be allowed to pass through the rear quadrupole mass filter 234 was scanned by changing voltage applied to the rear quadrupole mass filter 234 on a bit-by-bit basis. For example, in a case of scanning a mass-to-charge ratio range from 100 to 1000 and changing the mass-to-charge ratio of the ions to be allowed to pass through the rear mass separation section by 0.1 at a time, 9,000 steps were required to change the voltage to perform the product ion scan measurement one time, and the intensity of product ions was measured at each of the steps. On the other hand, with the liquid chromatograph mass spectrometer of the foregoing embodiment, the MRM measurement is performed using the plurality of MRM transitions. Thus, the number of steps to change the mass-to-charge ratio may be equivalent to that of the MRM transitions used, thereby resulting in a reduction in length of time (loop time) required for executing a series of measurements. Additionally, the conventional product ion scan measurement was required to be performed under the plurality of conditions in which the collision energy varies. In a contrast, in the multi-MRM measurement executed according to the present invention, the MRM measurement is performed in accordance with the optimal collision energy (i.e., collision energy having highest detection sensitivity of product ions) for each of the MRM transitions. The multi-MRM measurement is thus not required to be performed in accordance with various collision energies, thereby resulting in further reduction in the loop time.

Figure 1A:
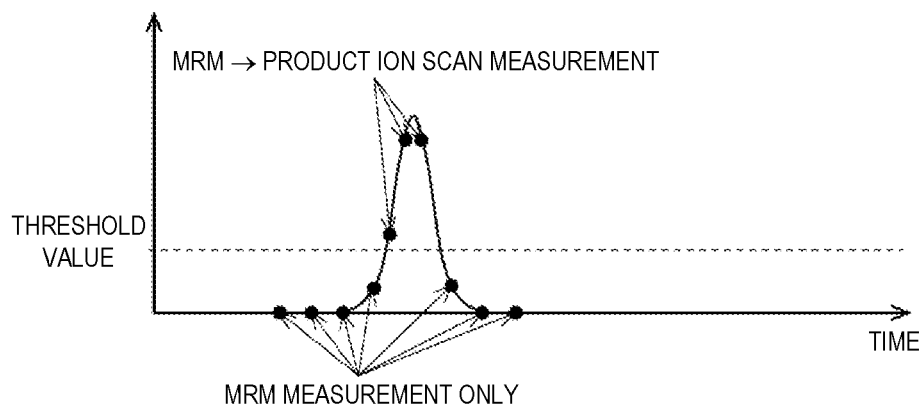
FIGS. 1A to IC are diagrams, each illustrating an additional measurement in a conventional configuration.
Figure 1B:
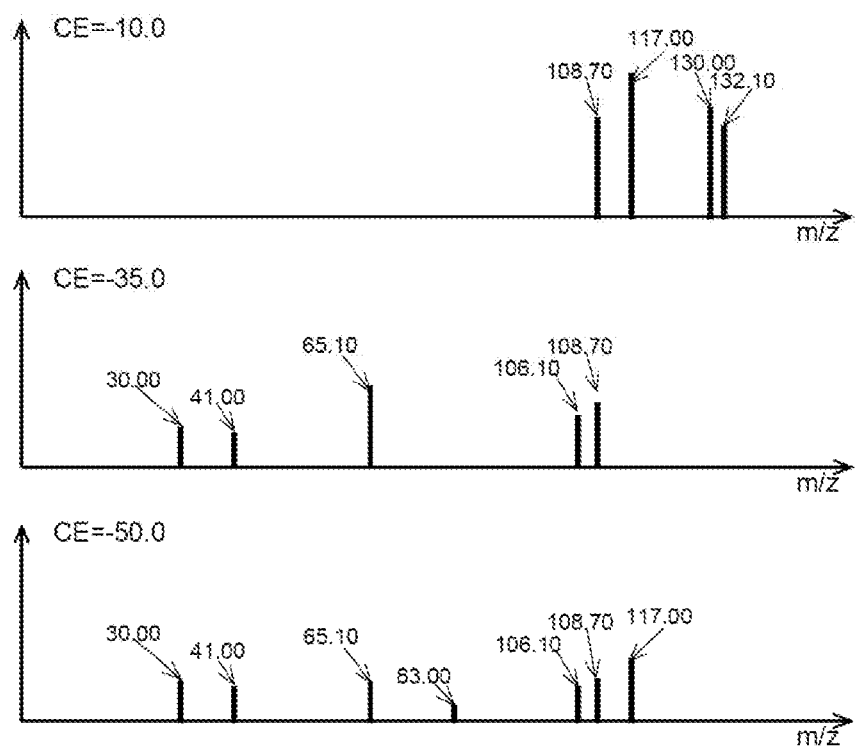
Figure 1C:
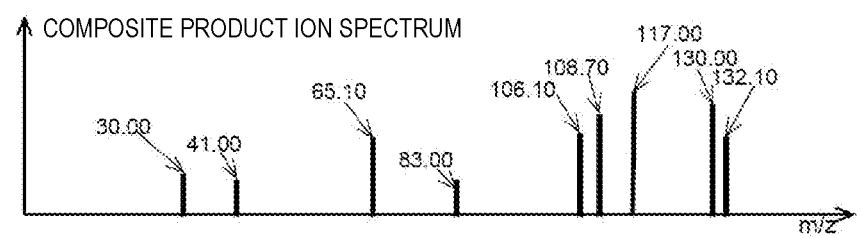

Furthermore, in the conventional product ion scan measurement, the mass-to-charge ratio of precursor ion was fixed, whereas in the liquid chromatograph mass spectrometer of the foregoing embodiment, the mass-to-charge ratio of precursor ion varies in accordance with the plurality of MRM transitions. For example, in the measured multi-MRM spectrum illustrated in FIG. 6, it is possible to display a mass peak for a precursor ion having the value of 182.40, which is not the case of the composite product ion spectrum in FIG. 1B, and which thus allows the operator to determine whether or not the compound matches the target compound (determine the false-positive).

Conventionally, the product ion scan measurement was performed when triggered by the intensity of product ions in the MRM measurement exceeding the threshold value. In the conventional method, the product ion scan measurement was performed only during the period of retention time for the target compound, hindering the removal of noise from the product ion spectrum. On the other hand, with the liquid chromatograph mass spectrometer of the foregoing embodiment, the intensity of product ions (measurement noise) on each of the channels is measured even before and/or after the execution time for each of the events. This configuration acquires the measured multi-MRM spectrum free of measurement noise and at higher accuracy.

The foregoing embodiment is merely an example of the present invention, and any change or modification appropriately made within the spirit of the present invention will naturally fall within the scope of claims of the present invention. In the foregoing embodiment, a triple quadrupole mass spectrometer has been used to perform the measurements in accordance with the MRM transitions, each of which is a combination of the precursor ion directly generated from each of the components contained in sample and product ions generated from the precursor ion. With a mass spectrometer which includes a constituent element capable of fragmenting ions a plurality of times, e.g., an ion trap, and which is thereby capable of performing an $MS^3$ or greater-than-$MS^3$ analysis, it is possible to perform a measurement in accordance with an MRM transition which is a combination of a precursor ion generated by fragmentation of each of the components contained in sample once or more than once and product ions generated from the precursor ion. Alternatively, the liquid chromatograph may be replaced with a gas chromatograph.

In the foregoing embodiment, a chromatograph mass spectrometer has been described as an example. Alternatively, the measurements previously described may be performed by a mass spectrometer only, without using the chromatograph. In this case, a component contained in a sample is measured without being separated in the mass spectrometer. Nonetheless, the mass spectrometer according to the present invention performs the measurement using the plurality of MRM transitions characteristic of each of target compounds and thus has higher selectivity for the target compound, as a result of which the measured multi-MRM spectrum is acquired by simply performing the measurement without the separation of component in the sample.

REFERENCE SIGNS LIST

1 . . . Liquid Chromatograph Unit
10 . . . Mobile Phase Container
11 . . . Pump
12 . . . Injector
13 . . . Column
14 . . . Auto-sampler
2 . . . Mass Spectrometer Unit
20 . . . Ionization Chamber
201 . . . ESI Probe
202 . . . Heated Capillary
21 . . . First Intermediate Vacuum Chamber
211 . . . Ion Guide
212 . . . Skimmer
22 . . . Second Intermediate Vacuum Chamber
221 . . . Ion Guide
23 . . . Analysis Chamber
231 . . . Front Quadrupole Mass Filter
232 . . . Collision Cell
233 . . . Multipole Ion Guide
234 . . . Rear Quadrupole Mass Filter
235 . . . Ion Detector
4 . . . Control Unit
41 . . . Storage Section
411 . . . Compound Table
412 . . . Spectrum Library
42 . . . Target Compound Input Receiving Section
43 . . . Method File Creation Section
44 . . . Measurement Execution Section
45 . . . Measured Spectrum Creation Section
46 . . . Noise Removal Spectrum Creation Section
47 . . . Similarity Degree Calculation Section
48 . . . Spectrum Display Section
6 . . . Input Unit
7 . . . Display Unit

The invention claimed is:

1. A mass spectrometer provided with: a front mass separation section in which an ion having a predetermined mass-to-charge ratio is selected as a precursor ion among ions originating from a compound contained in a sample; a fragmentation section in which the precursor ion selected in the front mass separation section is fragmented into product ions; and a rear mass separation section in which the product ions generated in the fragmentation section are subjected to mass separation, and capable of performing an MSn analysis (where n is an integer equal to or greater than two), the mass spectrometer comprising:

a) a storage section for storing a plurality of MRM measurement conditions and a plurality of data sets of standard multi-MRM spectrums respectively corresponding to a plurality of compounds, wherein each of the plurality of MRM measurement conditions include a plurality of MRM transitions, each of the plurality of MRM transitions being a combination of the precursor ion and the product ions, and each of the plurality of data sets of standard multi-MRM spectrums represents a mass spectrum indicating an intensity of product ions as a mass peak on a graph having mass-to-charge ratios of the product ions on one axis, the intensity of the product ions being measured by executing the MRM measurement condition;

b) a target compound input receiving section for receiving an input indicating one or more target compounds by an operator;

c) a measurement execution section for reading, from the storage section, the MRM measurement conditions respectively corresponding to the one or more target compounds, and measuring the sample under the MRM measurement conditions;

d) a measured multi-MRM spectrum creation section for creating a measured multi-MRM spectrum indicating an intensity of product ions as a mass peak on a graph having mass-to-charge ratios of the product ions on one axis, the intensity of the product ions being acquired by measuring the sample; and e) a similarity degree calculation section for obtaining for each of the one or more target compounds, a degree of similarity between the standard multi-MRM spectrum stored in the storage section and the measured multi-MRM spectrum, wherein the plurality of MRM transitions include three or more MRM transitions, each having a different mass-to-charge ratio of at least one of the precursor ion and the product ions.

2. The mass spectrometer according to claim 1, wherein the plurality of MRM transitions include six or more to 16 or less MRM transitions, each having a different mass-to-charge ratio of at least one of the precursor ion and the product ions.

3. The mass spectrometer according to claim 1, further comprising:

f) a spectrum display section for displaying, for each of the one or more target compounds, the standard multi-MRM spectrum and the measured multi-MRM spectrum.

4. A chromatograph mass spectrometer comprising:

the mass spectrometer according to claim 1; and g) a chromatograph for temporally separating a compound contained in a sample, wherein the MRM measurement conditions further include information for a period of measurement time during which the sample is measured based on the MRM measurement conditions, and the measurement execution section repeatedly performs an execution in which the sample is measured based on the MRM measurement conditions during the period of measurement time.

5. The chromatograph mass spectrometer according to claim 4, wherein the period of measurement time includes a period before a time at which an elution of the compound from the chromatograph begins and/or a period after a time at which the elution of the compound from the chromatograph ends.

6. The chromatograph mass spectrometer according to claim 4, further comprising:

h) a noise removal spectrum creation section for performing, for each of the one or more target compounds, a process of subtracting a measured multi-MRM spectrum data acquired outside a period of retention time of a corresponding one of the target compounds from a measured multi-MRM spectrum acquired within the period of retention time of the corresponding one of the target compounds.

* * * * *